May 19, 1970  C. W. OSTROM  3,512,757
MAGNETIC TRACTION LINE HAUL
Original Filed July 11, 1966  2 Sheets-Sheet 1
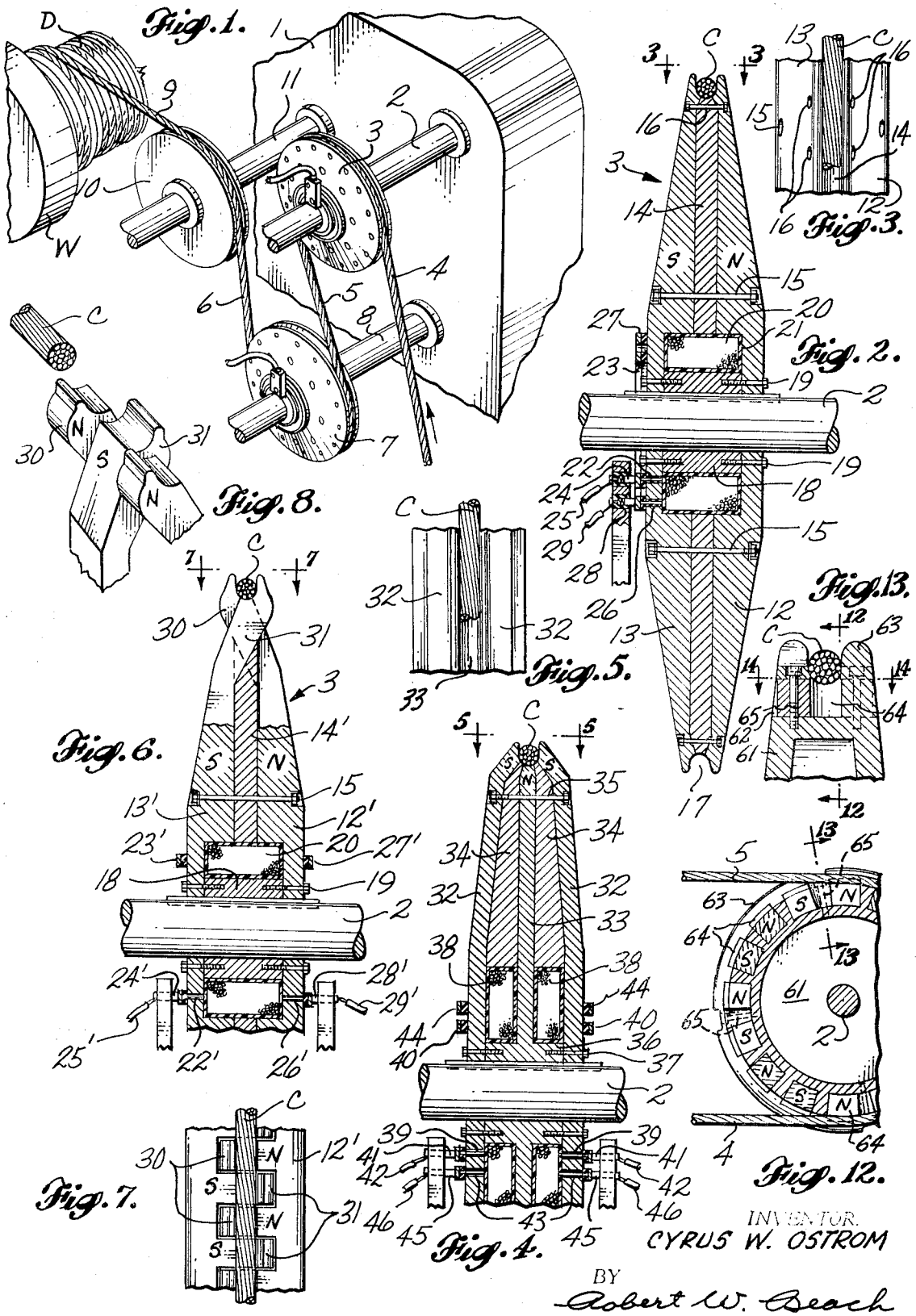
INVENTOR.
CYRUS W. OSTROM
BY
Robert W. Beach
ATTORNEY May 19, 1970     C. W. OSTROM     3,512,757
MAGNETIC TRACTION LINE HAUL
Original Filed July 11, 1966     2 Sheets-Sheet 2
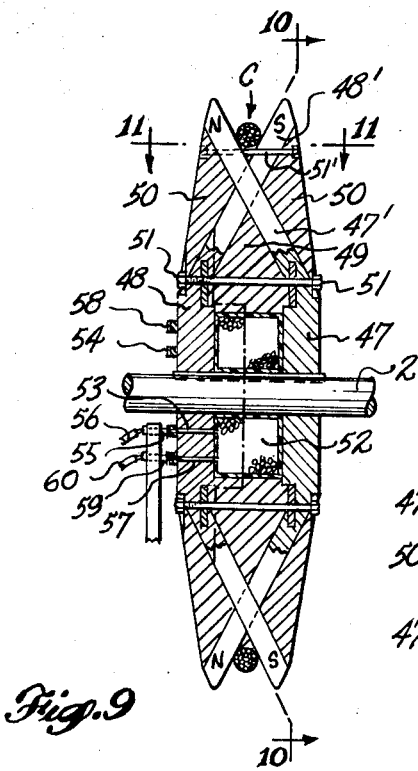
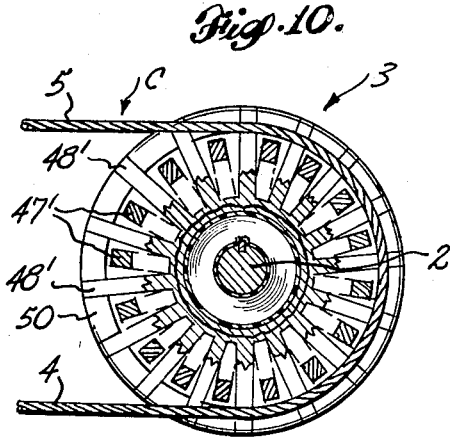
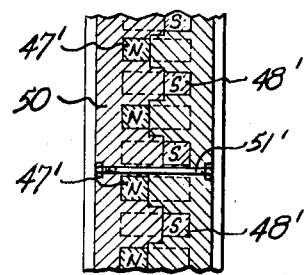
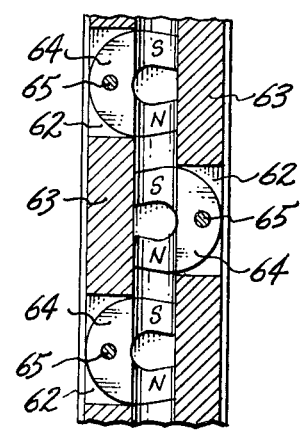
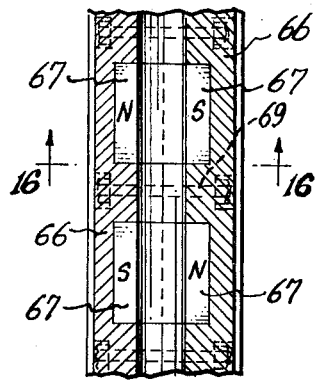
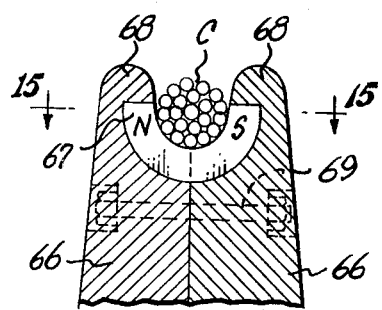
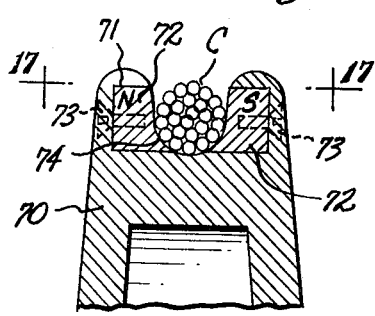
INVENTOR.
CYRUS W. OSTROM
BY
Robert W. Beach
ATTORNEY

# United States Patent Office 3,512,757
Patented May 19, 1970

3,512,757
MAGNETIC TRACTION LINE HAUL
Cyrus W. Ostrom, Seattle, Wash., assignor to Consolidated Electric Corporation, Seattle, Wash., a corporation of Washington
Continuation of abandoned application Ser. No. 564,289, July 11, 1966. This application Feb. 23, 1968, Ser. No. 710,681
Int. Cl. B66d 1/30, 1/76
U.S. Cl. 254—135                           21 Claims

ABSTRACT OF THE DISCLOSURE

A line haul for steel cable includes one or more power sheaves ahead of a cable storage drum. Each sheave has a circumferential groove in which the cable fits closely and unlike magnet poles are spaced transversely of the groove to produce a flux path intersecting the groove transversely of its length and passing through the cable transversely of its length. The unlike poles may be the peripheries of disks extending circumferentially of the sheave without interruption, and there may be two or three of such disks with nonmagnetic material sandwiched between them. Alternatively, unlike poles may be arranged alternately circumferentially of the sheave and with unlike poles generally in axial registry at opposite sides of the groove. Such magnets may be either of the permanent magnet type or of the electromagnet type. Also, such poles may project radially from side disks of the sheave, or the poles may be poles of U-shaped, permanent magnets arranged with their central portions cradling the cable in the groove, the opposite radially projecting ends forming the poles, or permanent bar magnets can be arranged at opposite sides of the groove with their lengths extending circumferentially of the sheave and having unlike poles arranged in registry transversely of the length of the groove.

---

This application is a continuation of application 564,289 filed July 11, 1966, now abandoned.

In oceanography exploration, submarine cable laying, and other deep sea projects, the problem of handling long lines on shipboard occurs. It may be desirable to moor a ship in water having a depth of several thousands of feet. In order to provide a line long enough to reach the bottom at such depth the line itself must be quite heavy simply to support the weight of the line at the surface, in addition to being able to withstand the tension loads placed on lines in maintaining the ship's position against the force of wind and tide. When the size of steel cable is increased to carry its own weight as well as carrying the tension forces placed on it by its use, it becomes necessary to apply a very large hauling force to the line to reel it in when it extends to the ocean bottom at such a depth. If a cable is simply wound on a winch drum under such circumstances, the tension exerted on the cable to reel it in will produce large forces radially of the drum tending to draw the last cable wrap radially inward between cable wraps previously laid on the drum. Such cable wraps will thus be wedged together, which creates undesirable friction forces between the adjacent wraps of the cable and also produces a wedging thrust directed longitudinally of the drum which can be sufficiently great to force the end flanges of the drum off the cylindrical portion of the drum, so that the cable wraps on the drum can slip over the unflanged drum end.

It is the principal object of the present invention to increase the traction between a cable bight and the groove of a sheave in which such cable bight is received without reliance primarily on the force of friction between the cable and the surface of the sheave groove. It is a specific object to increase such traction by the use of magnetic attraction force providing a flux path through the cable extending transversely of the cable length.

A further object is to reduce the load on a winch drum so that the drum structure can be made lighter for a given cable capacity and can be made larger to increase its capacity without increasing its strength comparable to conventional winch drums. An associated object is to facilitate the winding of cable on a hauling drum and paying out of the cable from it. An incidental object is to enable cable to be wound on a drum in a more even and orderly fashion, particularly because a wrap of one layer of cable will not be nearly as inclined to be pulled down toward the center of the drum into an inner layer of cable.

Another object is to provide a line haul which will have a constant orientation to the line being hauled and to line guide means for such line, and which will reel in the line on a rotative member at a constant radial distance from the axis of such rotative member.

More particularly, it is an object to provide a line haul sheave which will maintain constant position so as to avoid the necessity of providing a substantial pull sidewise on a cable, and such a sheave can be employed in combination with any additional number of sheaves in series. Each sheave can be supported by a bearing or bearings close to the sides of the sheaves so that the shaft of the sheave will be stressed principally in shear and will be subjected to minimum bending loads. To be able to withstand shaft loads most advantageously it is also an object to enable the sheave supporting shaft to be carried by bearings at both sides of the sheave and located close to it in a compact arrangement.

Moreover, such a structure enables a sheave to be replaced expeditiously with a sheave of a different size or groove width or both to accommodate different sizes of cables.

Another object is to provide a line haul which will engage the cable generally contiguously instead of pinching it in width so as to produce interstrand friction, and in which the cable will not be forced to slide relative to a strand or strands alongside it which would create friction tending to wear or fray the cable. In particular, it is an object to cradle the cable when under principal stress in a form-fitting sheave groove so as to reduce the wear on the cable and also reduce the wear on the sheave groove.

Despite the advantages mentioned above it is an object to simplify the construction and operation of a line haul generally and to minimize wear and breakage of its parts while at the same time rendering the haul easier to operate and more efficient in operation.

These various objects can be accomplished by a line haul utilizing a power sheave or a plurality of power sheaves in series ahead of a winch drum, which sheave or sheaves will apply the necessary hauling force to the cable, and the only force which must be applied to the cable by the drum is enough to wind it, although the drum may supply a greater proportion of the hauling force than this, and the force applied to the cable by the sheave or sheaves will simply supplement the winding force supplied by the drum. It is preferred, however, for the power sheave or sheaves to supply a major portion of the hauling force. Traction of the cable on each power sheave is greatly increased by utilizing a magnetized sheave in which the lines of magnetic flux between unlike magnet poles pass through the cable transversely of its length when lodged in the line-receiving groove of each power sheave. Such magnetic force can be produced by electromagnetic means or permanent magnets having poles arranged at opposite sides of the groove.

FIG. 1 is a top perspective of a line haul incorporating the present invention.

FIG. 2 is a diametral section through a power sheave of the line haul, and FIG. 3 is a fragmentary edge view of such sheave taken on line 3—3 of FIG. 2.

FIG. 4 is a diametral section of a portion of an alternate type of power sheave which can be used in the line haul, and FIG. 5 is a fragmentary edge view of such sheave on line 5—5 of FIG. 4.

FIG. 6 is a diametral section of a portion of another type of power sheave with parts broken away, FIG. 7 is a fragmentary edge view of such sheave as viewed from line 7—7 of FIG. 6, and FIG. 8 is a detail top perspective of selected components of such sheave.

FIG. 9 is a diametral section through still another form of power sheave, FIG. 10 is a section through such sheave along a cone indicated by line 10—10 of FIG. 9, and FIG. 11 is a fragmentary circumferential section through this sheave, taken at the radial position indicated by line 11—11 of FIG. 9.

FIG. 12 is a transverse section through a different type of power sheave taken on the plane indicated by line 12—12 of FIG. 13, parts being broken away; FIG. 13 is a detail radial section through the peripheral portion of such sheave on line 13—13 of FIG. 12; and FIG. 14 is a fragmentary circumferential section through the sheave taken at the radius indicated by line 14—14 in FIG. 13.

FIG. 15 is a fragmentary circumferential section at the radius indicated by line 15—15 of FIG. 16 of a modified form of sheave such as shown in FIG. 12, and FIG. 16 is a fragmentary radial section of such sheave taken on line 16—16 of FIG. 15.

FIG. 17 is a fragmentary circumferential section taken at the radius indicated by line 17—17 of FIG. 18 of a further modification of a power sheave such as shown in FIG. 12, and FIG. 18 is a fragmentary radial section through such a sheave on line 18—18 of FIG. 17.

A representative line haul employing the present invention is illustrated in FIG. 1 as an anchor-line haul for use on shipboard, but it will be understood that the invention has application for any type of line haul. In particular the haul of the present invention is most useful for installations in which great pulling stress must be exerted on a line and/or where it is desirable to store a large amount of cable on a drum which must therefore be of considerable length so that the cable can be laid back and forth on the drum. In such situations the principal hauling force can be applied to the cable independently of the drum, and the winding force exerted by the drum is secondary.

The power drive mechanism 1 is connected to rotate the shaft 2 in the winding direction indicated by the arrow. On this shaft is mounted the power sheave 3 into the circumferential groove of which is laid the cable stretch 4 and from the opposite side of which is stripped the cable stretch 5 so as to form a return bend bight of the cable C in the groove of the sheave. Thus the line is engaged with the groove of the sheave over approximately a half wrap. To divide the pulling stress exerted on the line between a plurality of power sheaves the line can make a second return bend between stretches 5 and 6 in series with the return bend between stretches 4 and 5. This return-bend bight can be lodged in the groove of a second power sheave 7, which is mounted on a second shaft 8 connected to the power mechanism 1 and driven by it in synchronism with shaft 2.

From the stretch 6 the line can make a quarter bend between it and stretch 9, which is received in the circumferential groove of a further sheave 10 mounted on a shaft 11. This sheave can simply be a guide sheave, or shaft 11 also can be connected to the power mechanism 1 to be driven by it. The line stretch 9 then leads onto the drum D of a winch W on which the line is stored. The sheaves 3, 7 and 10 should be selected so that their diameters will be large enough to prevent the bight of the cable received in their grooves from being bent so sharply as to produce undesirable friction between the strands of the cable or otherwise subject the cable to unnecessary stresses, while at the same time being small enough so that the torque of each shaft can be transmitted effectively through a reasonably short lever arm to the line.

The heart of the present invention is to provide adequate traction between the cable C and the groove of each sheave to prevent appreciable slippage circumferentially of the sheave while the cable is cradled substantially contiguously in the groove of the sheave without being pinched appreciably. Such traction is accomplished by utilizing a magnetized structure for the sheave arranged so that the steel cable will serve as an armature through which magnetic flux passes transversely of the cable length between unlike poles of the magnet components. Such magnet components may be of the electromagnet type or of the permanent magnet type or a combination of both type. FIGS. 2 to 11 inclusive illustrate several forms of electromagnetic sheave construction, and FIGS. 12 to 18 inclusive illustrate several forms of permanent magnet sheave construction.

In the sheave construction shown in FIGS. 2 and 3 two side plates 12 and 13 of magnetic material are secured to opposite sides of a central or core plate 14 of nonmagnetic material by bolts 15 in an inner row and bolts 16 in an outer row. The marginal portions of the disks 12 and 13 project radially beyond the circumference of the central plate 14. Such marginal portions of the side plates 12 and 13 and the periphery of the central plate 14 are shaped to form cooperatively the opposite sides and bottom of the line-receiving groove 17. The depth of such groove is at least half as great as its maximum width, as shown in FIG. 2, so that a line can be wedged firmly between the sides of such groove. The groove provides an anticlastic line-engaging surface. The central portions of the disks 12 and 13 are spaced apart by a hub collar 18 keyed to shaft 2. Machine screws 19 secure together the central portions of the side plates 12 and 13 and the hub collar 18.

In an annular cavity encircling the core ring 18 is lodged an exciting coil 20 enclosed in an insulating casing 21 to separate it from the metal disks 12, 13 and 14 and the metal core 18. Direct current is supplied to one terminal 22 of the coil 20 through a slip ring 23 to which such terminal is attached. A brush 24 engaging such slip ring is connected by a lead 25 to a source of direct current. The other terminal 26 of the exciting coil 20 is connected to a second slip ring 27 concentric with slip ring 23 and shaft 2. A brush 28 engaging this slip ring is supplied with direct current by a second lead 29. Direct current supplied to the leads 25 and 29 will magnetize the side plates 12 and 13 with opposite polarities depending upon the direction in which the current flows through the coil 20. Thus, for example, as indicated in FIG. 2, the plate 12 can be magnetized so that its periphery forms a north pole extending unbroken throughout its circumference and the plate 13 can be magnetized so that its periphery forms a south pole extending unbroken throughout its circumference.

In order to be magnetizable by current flowing in the coil 20 the side plates 12 and 13 may be made of mild steel. The nonmagnetic material of which the separator plate 14 is made may be brass. The connecting bolts 15 and 16 also may be brass, whereas the core collar 18 and bolts 19 should be made of steel to complete the magnetic flux circuit between the side plates 12 and 13. As shown in the upper portion of FIG. 2 and in FIG. 3, the groove 17 preferably is made of a cross section which will embrace the cable C substantially contiguously. Since the bottom of the groove formed by the periphery of the separator plate 14 is nonmagnetic, the magnetic flux will flow between the magnetic poles formed by the marginal flanges of the plates 12 and 13 through the steel cable C as an armature transversely of the length of the cable. The flux will therefore draw the cable into the groove and hold it in such groove because, as shown at the bottom FIG. 2, the portions of the disk flanges are closer together adjacent to the bottom of the groove where the magnetic flux consequently will be more concentrated. Such attraction of the cable by the magnetized disk flanges will produce a strong traction effect on the cable to move it with the circumferential groove of the sheave 3 as it turns.

In the type of composite sheave shown in FIGS. 4 and 5 the two side plates 32 and the central plate 33 are all made of magnetic material. The plates 34 received between the central plate 33 and the two side plates 32, respectively, are made of nonmagnetic material such as brass. The periphery of the central plate 33 is shown at the top of FIG. 4 and in FIG. 5 as forming the bottom of a circumferential groove for receiving the cable C, and the marginal portions of the two side disks 32 are bent toward each other over the marginal portions of the separator disks 34 to form the opposite sides of the cable-receiving grooves. A small portion of the groove bottom at opposite sides of the margin of plate 33 will be formed by the margins of plates 34 so as to separate the poles formed by the margins of plates 32 and plate 33. The outer portion of this plate sandwich can be secured together by bolts 35 spaced circumferentially of the sheave in a circular row.

A hub flange 36 of magnetic material such as mild steel can be formed integral with the inner edge of the central disk 33, and its opposite ends are secured to the central portions of the side plates 32 by steel machine screws 37. Such hub flange is keyed to the drive shaft 2. In this instance the magnetic disks 32 and 33 can be magnetized by electromagnetic exciting coils 38 located in annular cavities between the hub flange 36 and the inner peripheries of the separating disks 34. The current direction in one of these coils can be opposite to the current direction in the other coil so that the polarity of the two outer disks 32 will be the same and will be different from the polarity of the central disk 33. At the upper portion of FIG. 4 the outer disks are shown as being south poles, and the central disk is shown as being a north pole.

To excite the two coils 38 in this manner the connections to the two coils are separate. Thus one terminal 39 of each coil can be connected to a radially inner slip ring 40 mounted on each side of the sheave concentric with shaft 2. Such slip rings are engaged respectively by brushes 41 to which leads 42 are connected. The opposite terminals 45 of the two coils are connected to slip rings 44 mounted on opposite sides of the sheave concentric with the slip rings 40. The slip rings 44 are engaged by brushes 45 which are connected to electric leads 46. The leads 42 and 46 will be connected to suitable direct current sources for producing current in opposite directions in the two coils 38 as previously explained. A steel cable C laid in the sheave groove will then serve as an armature for flow of magnetic flux through it transversely of its length between the marginal portions of the two side plates 32 and the periphery of the central plate 33. The magnetic attraction of the cable C will in the manner previously explained greatly increase the traction of cable C in the groove of the sheave.

In FIGS. 6, 7 and 8 the side plates 12' 13' of magnetic material such as mild steel are laminated with the central separator plate 14' of nonmagnetic material in a manner similar to the construction of the sheave 3 described in connection with FIGS. 2 and 3. The three plates are held together in their laminated relationship by bolts 15, and the central portions of the outer plates 12' and 13' are secured together by machine screws 19 extending into the collar 18 of magnetic material which is keyed to the shaft 2. The exciting coil 20 is received in an annular cavity in the sheave structure, as in FIG. 2, encircling the hub collar 18.

While the connections to the exciting coil 20 of FIG. 6 could be like those shown in FIG. 2, an alternative arrangement is shown in which one terminal 22' of the coil 20 is connected to a slip ring 23' on one side of the sheave, which is contacted by a brush 24' connected to a lead 25'. The other terminal 26' of the coil is connected to a slip ring 27' on the other side of the sheave, which is engaged by a brush 28' to which a lead 29' is connected. The leads 25' and 29' will, of course, be connected to a suitable source direct current which will effect magnetization of the side plates 12' and 13' with different polarities, such as the plate 12' being a north pole and the plate 13' being a south pole.

The principal difference in construction between the sheaves 3 of FIGS. 2 and 6 is in the structure of the marginal portions of the side disks. While as described above the marginal portions of the disks 12 and 13, shown in FIGS. 2 and 3, take the form of continuous circumferential flanges constituting unlike magnet poles forming opposite sides of the cable-receiving groove, the marginal portions of the plates 12' and 13' shown in FIGS. 6, 7 and 8 are notched to form spaced fingers constituting unlike magnet poles. Notches extending inwardly from the periphery of side plate 12' form circumferentially spaced radially projecting fingers 30 bent towards the opposite side of the sheave, the tips of which constitute like magnet poles. Similarly, grooves extending inward from the periphery of disk 13' form circumferentially spaced radially projecting fingers 31 bent toward the opposite side of the sheave, the tips of which constitute like magnet poles of the opposite polarity.

In each instance the circumferential width of the grooves in the margin of one disk is greater than the circumferential thickness of the radially projecting fingers of the other disk. The holes in the disks 12' and 13' for receiving the volts 15 are arranged so that when such holes are aligned the fingers 30 and 31 will fit in interdigitated relationship as shown best in FIGS. 7 and 8. The magnet pole tip of each finger is formed arcuately concave as shown in FIGS. 6 and 8, and these finger tips are located transversely of the disk grooves between them in positions such that the concave surfaces of the finger tips will cooperate to cradle a cable C substantially contiguously. The separator plate 14' has alternate grooves formed in its periphery to embrace the fingers 30 and 31 and to fill the slots between them at the bottom portion of the sheave's peripheral groove.

While opposite sides of the cable-receiving groove could be interrupted in the type of sheave construction shown in FIGS. 6, 7 and 8, the construction illustrated in FIGS. 9, 10 and 11 provides an arrangement in which the sheave's groove wall can be formed cooperatively by interfitting magnetic and nonmagnetic components. In this instance the side plates 47 and 48 are made of magnetic material such as mild steel. From the periphery of plate 47 fingers 47' project generally radially but are inclined. Similarly, fingers 48' project generally radially from the circumference of plate 48 but are also inclined. These plates can be made of similar construction, and the size and spacing of the fingers 47' and 48' of the two plates will be similar. The spacing will be greater than the thickness of the fingers in each instance in the region where the fingers cross, as shown in FIG. 9, so that they will be separated by a thickness of nonmagnetic material.

Between the plate portions 47 and 48 of the magnetic spiders a central spacer annulus 49 is provided, the periphery of which is grooved to receive the spider fingers, and the periphery of this separator can be flush with the outer edges of the fingers 47' and 48' up to the intersection location. Each side of the sheave adjacent to the periphery of the sheave can be formed by an annular plate 50 having inner grooves in its peripheral portion to receive the inclined radiating fingers 47' and 48'. Such plates are of nonmagnetic material such as brass. The plates on opposite sides of the sheave can be secured together by bolts 51 and 51' spaced circumferentially of the sheave and arranged in circular rows. The outer portions of the plates 50 in conjunction with the fingers 47' and 48' can be shaped to form a groove substantially complemental to the cable C.

To magnetize the fingers 47' and 48' so that their tips constitute magnet poles an exciting coil 52 is provided in the hollow interior of the sheave encircling the shaft 2 disposed between the plate portions 47 and 48 of the spiders and located inwardly of the inner periphery of the spacer ring 49. One terminal 53 of this coil is connected to a slip ring 54 with which brush 55 is engaged. An electric lead 56 is connected to such brush. The other terminal 57 of the coil is connected to a second slip ring 58 concentric with slip ring 54 and shaft 2. A brush 59 connected to a lead 60 engages such slip ring.

While the various embodiments of the present invention described above have utilized electromagnetic components to attract a cable in the groove of a sheave, it is also possible to utilize permanent magnets for this purpose, and several types of devices are shown incorporating permanent magnets. In the sheave shown in FIGS. 12, 13 and 14 the central portion of the sheave may be hollow between opposite walls 61. Magnet-receiving sockets 62 are provided in the marginal portion of the sheave immediately beneath the opposite annular flange portions 63 forming the sides of the peripheral groove in which the cable C seats. The magnet sockets 62 open at opposite sides of the sheave for receiving in them horseshoe magnets 64, each of which can be secured in place by a suitable bolt 65 extending through the back of the magnet.

The horseshoe magnets 64 are fitted into the sockets 62 at alternate locations around the periphery of the sheave, as indicated in FIG. 14. Thus one horseshoe magnet is inserted from the left side and the next magnet is inserted from the right side, and so on around the circumference of the sheave. All of the magnets have one type of pole on the upper side, as seen in FIG. 14, and the other type of pole on the lower side, so that unlike poles are always nearest to each other. The magnetic flux passes between such unlike poles through the steel cable as an armature, both between the unlike poles of a single magnet and between the adjacent unlike poles of two magnets.

A different type of horseshoe magnet installation is shown in FIGS. 15 and 16. In this instance the body of the sheave is composed of two side plates 66 having recesses in their marginal portions for receiving the horseshoe magnets 67 in the groove-forming portion of the sheave beneath the flanges 68 at opposite sides of the cable-receiving groove. The shape of the magnets and the intermediate portions of the nonmagnetic plates 66 between them is complemental to the cable C received in the groove. The two side plates 66 are secured together by bolts 69 of nonmagnetic material, which preferably is the same type of nonmagnetic material as the sheave sides 66, such as brass.

The polarity of each permanent magnet 67 is opposite the polarity of the next adjacent magnet as shown in FIG. 15. Magnetic flux can then pass between the poles of a single permanent magnet through the cable C as an armature transversely of its length, and if the magnets are arranged as shown in FIG. 15, flux can also pass through the sides of the cable received in the groove between unlike poles of adjacent magnets. Alternatively, the several magnets 67 can be oriented with their north poles all on the same side of a power sheave and with their south poles all on the other side of such sheave. Not only will the magnetic flux pass between the opposite poles of the same magnet, therefore, but magnetic flux can pass from the pole of one magnet through the cable C as an armature in a diagonal direction at an angle to the length of the cable to the unlike magnetic pole of an adjacent horseshoe magnet.

In FIGS. 17 and 18 still a different construction is shown using permanent magnets. In this instance the body portion 70 of the sheave has flanges 71 at opposite sides of the cable-receiving groove, and these flanges have inwardly opening sockets for reception of permanent bar magnets 72 within them. These bar magnets can be held in place in their sockets by one or more screws 73 extending through a wall of a flange into the magnet. These magnets have exposed faces and have projections which conform to the shape of the sheave's peripheral groove so as to increase the magnetic effect on the cable as an armature.

FIG. 17 shows a representative arrangement of the magnets along the groove. The magnets are located in staggered arrangement around the circumference of the sheave, and such magnets are of a length and are spaced apart sufficiently so that north and south poles on one side of the sheave groove are arranged in registry directly across the groove with unlike poles of other magnet units. The lengths of the bar magnets should be sufficiently great so that unlike poles across the groove will exert substantial attraction on a cable in the groove, transversely of the cable length, but the magnets should not be so long as to prevent interaction between adjacent unlike magnet poles along one side of the groove.

By these various arrangements described rotation of the sheave causes a cable to be laid in its groove and to be attractively held by constituting the armature through which magnetic flux can pass between unlike poles whether of the permanent magnet type or of the electromagnet type. Where permanent magnets are used many special alloys such as one of aluminum, nickel and cobalt can be utilized to increase their effectiveness. Also as suggested in the representative forms of installation illustrated in the drawings and discussed above, such permanent magnets can be either of the horseshoe type straddling the groove or of the bar type, located alongside the groove but in either case they should be designed specially so as to provide magnet poles of opposite polarity located respectively at opposite sides of the cable-receiving groove transversely of the groove length, so that a steel cable will form an effective armature for such magnet poles because the magnetic flux passes through such cable transversely of its length.

Also where electromagnets are used, the particular form of the magnet can differ in different installations and the strength of the magnetic flux provided will depend primarily on the type of coil utilized to produce the magnetic flux and the shape and design of the magnet poles.

Whichever type of magnet is used for the sheaves each magnetized power sheave will grip the cable effectively whether it is being reeled in or being paid out. The magnetic action will attract the incoming tighter stretch of the cable as soon as it is laid into the groove of the sheave. At the opposite side of the sheave, the magnetic attraction will attempt to retain in the groove the less taut outrunning stretch of the cable, and such stretch will be stripped from the cable groove by being wound onto another sheave or the drum, or by being drawn away from the sheave grove by the weight of the cable or some other force applied to it.

I claim:

1. A line haul having magnetically-increased wedging traction comprising a rotative body having a peripheral outwardly-flared line-receiving groove of a depth at least approximately half as great as its maximum width, a long flexible stranded-cable ship's deep water line of magnetic metal having a stretch received in and bent around a circumferential arc of said rotative body groove and said line stretch having opposite side portions which are spaced arcuately of the line circumference at least 90° bearing wedgingly on opposite side portions of said flaring groove at locations spaced from the groove bottom, and magnet means arranged along at least portions of such opposite sides of said groove providing magnetized opposite groove side portions extending in the groove cross section outwardly to a location beyond the portions of the groove sides against which said opposite side portions of said line stretch bear wedgingly, and said magnet means having pole means which produce a magnetic flux path through said line extending transversely of the length of said groove and of said line stretch therein to press said opposite side portions of said line stretch against said opposite side portions of said groove and increase the traction between said opposite side portions of said line stretch and said opposite side portions of said rotative body groove against which said opposite side portions of said line stretch bear wedgingly.

2. The line haul defined in claim 1, in which the rotative body includes plates of magnetic material spaced apart axially of the body, each plate forming one side of the rotative body line-receiving groove, and the marginal portion of each of said spaced plates constitutes a circular magnet pole.

3. The line haul defined in claim 2, in which the rotative body is of sandwich construction, an intermediate layer of nonmagnetic material being disposed between the plates of magnetic material.

4. The line haul defined in claim 3, in which the circular magnet poles of the spaced plates and the periphery of the intermediate layer of nonmagnetic material are shaped to form cooperatively an anticlastic groove surface engaged by the line stretch.

5. The line haul defined in claim 2, in which the circular poles of the magnet plates at opposite sides of the rotative body line-receiving groove are unlike.

6. The line haul defined in claim 2, and an electric exciting coil in the central portion of the rotative body for magnetizing the spaced plates so that their marginal portions respectively constitute magnet poles of unlike polarity.

7. The line haul defined in claim 1, in which the magnet means includes three poles, each pole being circular and extending circumferentially continuously around the entire rotative body, two of said poles being alike and located on opposite sides of the third pole which is unlike said two poles.

8. The line haul defined in claim 2, in which the circular magnet poles of the spaced plates are alike, and a third plate of magnetic material located between the spaced plates, the marginal portion of said third plate constituting a magnet pole unlike the magnet poles of the spaced plates.

9. The line haul defined in claim 1, in which the pole means are formed by spiders having generally radially projecting fingers which mutually interfit circumferentially in interdigitated relationship.

10. The line haul defined in claim 9, in which fingers of different spiders are arranged in interdigitated crossing relationship with the portions of the fingers radially outward from the zone of crossing forming magnet poles, the poles at one side of the groove being of one polarity and the poles at the other side of the groove being of the opposite polarity.

11. The line haul defined in claim 1, in which the magnet means includes a horeshoe magnet straddling the rotative body groove and having poles extending outward along opposite sides of such groove, the pole of said magnet at one side of the groove being unlike the pole of said magnet at the other side of the groove.

12. The line haul defined in claim 1, in which the magnet means includes a first magnet having north and south poles, located entirely at one side of the central plane of the body perpendicular to its rotative axis and having both of its poles located alongside the corresponding side of the rotative body line-receiving groove and a second magnet also having north and south poles, located wholly at the opposite side of such central plane of the body and having both of its poles located alongside the side of the rotative body line-receiving groove opposite said first magnet.

13. The line haul defined in claim 12, in which a magnet pole of a magnet at one side of the rotative body groove is disposed in registry transversely of the length of the rotative body groove and the line stretch therein with an unlike magnet pole of a magnet at the opposite side of such groove.

14. The line haul defined in claim 12, in which the magnet means includes a plurality of permanent bar magnets located on one side of the rotative body groove and disposed with their lengths extending along such groove, and a plurality of permanent bar magnets located on the other side of the rotative body groove and disposed with their lengths extending along such groove, the magnets on one side of such groove being arranged in staggered relationship relative to the magnets on the other side of such groove locating unlike poles of the magnets on opposite sides of such groove in registry transversely of the length of such groove.

15. The line haul defind in claim 1, and an electric exciting coil in the central portion of the rotative body for magnetizing the magnet means.

16. The line haul defined in claim 1, in which the magnet means includes unlike poles spaced transversely of the length of the rotating body line-receiving groove and of the line stretch therein.

17. The line haul defined in claim 1, in which the magnet means includes two pole means projecting in axially spaced relationship generally radially at least substantially to the extreme circumference of the groove sides.

18. The line haul defined in claim 1, in which the magnet means includes poles forming portions of diametrically opposite sides of said groove producing magnetic flux paths between unlike magnet poles extending chordwise of the rotative body groove and to a greater extent transversely of the length of the magnetic line and of the rotative body groove than longitudinally of the magnetic line and such groove at locations substantial distances outward from the groove bottom.

19. The line haul defined in claim 17, the pole means at one side of the groove being unlike the pole means at the opposite side of the groove.

20. The line haul defined in claim 1, in which each magnet pole means is circular, extending circumferentially continuously around the entire rotative body, and the pole means at opposite sides of the groove extend outwardly substantially to the periphery of the rotative body.

21. The line haul defined in claim 1, the magnet means including horseshoe magnets spaced circumferentially around the periphery of the rotative body and having their poles forming portions of the groove, producing magnetic flux paths between unlike magnet poles through the magnetic metal line.

References Cited

UNITED STATES PATENTS

| 2,755,917 | 7/1956 | Koerner | 226—93 |
| 1,448,712 | 3/1923 | Pool | 198—41 |
| 2,588,085 | 3/1952 | Clouse | 198—41 |
| 3,059,156 | 10/1962 | Moriya | 335—306 |
| 3,163,596 | 12/1964 | Ferris | 335—285 |
| 3,334,724 | 8/1967 | Steward | 198—41 |

FOREIGN PATENTS 820,051 9/1959 Great Britain.

HARVEY C. HORNSBY, Primary Examiner

U.S. Cl. X.R.

74—229, 230.24; 226—93; 254—150, 175.5, 175.7; 335—285